(12) United States Patent
Saunders et al.

(10) Patent No.: US 7,971,275 B2
(45) Date of Patent: Jul. 5, 2011

(54) CUT RESISTANT DAMAGE TOLERANT CHEMICAL AND LIQUID PROTECTIVE GLOVE WITH ENHANCED WET AND DRY GRIP

(75) Inventors: Paul Saunders, Worcestershire (GB); Michael Flather, Worcestershire (GB); Dave Narasimhan, Flemington, NJ (US); William Bennett, Jackson, NJ (US)

(73) Assignee: Ansell Healthcare Products LLC, Red Bank, NJ (US)

( * ) Notice: Subject to any disclaimer, the term of this patent is extended or adjusted under 35 U.S.C. 154(b) by 109 days.

(21) Appl. No.: 12/542,443

(22) Filed: Aug. 17, 2009

(65) Prior Publication Data
US 2010/0037364 A1 Feb. 18, 2010

Related U.S. Application Data

(60) Provisional application No. 61/089,664, filed on Aug. 18, 2008.

(51) Int. Cl.
*A41D 19/00* (2006.01)
(52) U.S. Cl. .......................................... 2/161.6
(58) Field of Classification Search .............. 2/159, 169, 2/168, 161.8, 161.7, 161.6
See application file for complete search history.

(56) References Cited

U.S. PATENT DOCUMENTS

| | | | |
|---|---|---|---|
| 2,083,684 A | 6/1937 | Burke | |
| 3,268,647 A | 8/1966 | Hayes et al. | |
| 4,514,460 A | 4/1985 | Johnson | |
| 4,515,851 A | 5/1985 | Johnson | |
| 4,526,828 A | 7/1985 | Fogt et al. | |
| 4,555,813 A | 12/1985 | Johnson | |
| 4,589,940 A | 5/1986 | Johnson | |
| 4,779,290 A | 10/1988 | Welch et al. | |
| 4,833,733 A | 5/1989 | Welch et al. | |
| 5,070,540 A | 12/1991 | Bettcher et al. | |
| 5,200,263 A | 4/1993 | Gould et al. | |
| 5,581,812 A | 12/1996 | Krocheski | |
| 5,822,791 A | 10/1998 | Baris | |
| 6,021,524 A | 2/2000 | Wu et al. | |
| 6,543,059 B2 | 4/2003 | Szczesuil et al. | |

(Continued)

FOREIGN PATENT DOCUMENTS

WO    WO-2007/024127    3/2007

OTHER PUBLICATIONS

PCT International Search Report and Written Opinion in PCT/US2009/054121, (Oct. 6, 2009), 11 pgs.

*Primary Examiner* — Danny Worrell
(74) *Attorney, Agent, or Firm* — Moser IP Law Group

(57) ABSTRACT

A damage tolerant cut resistant chemical handling glove that is flexible and lightweight comprises a cured, liquid-impervious polymeric latex shell, a knitted cut resistant liner comprising a cotton yarn and at least one cut resistant yarn, the liner being infiltrated with a soft nitrile or polyurethane layer such that the liner bonds to the shell. The soft nitrile or polyurethane layer seals interstices of the cut resistant liner and replicates its rough texture on the external surface of the glove, providing enhanced grip properties. A thin nitrile latex layer applied to and cured together with the polyurethane layer to protect the polyurethane layer from oil or chemical degradation. The intimate seal thus created between the shell and the liner prevents accumulation of liquid there between, which prevents formation of a liquid boundary layer and interference with grip properties of the glove.

20 Claims, 3 Drawing Sheets

U.S. PATENT DOCUMENTS

| | | |
|---|---|---|
| 6,596,345 B2 | 7/2003 | Szczesuil et al. |
| 6,782,720 B2 | 8/2004 | Vero et al. |
| 6,782,721 B1 | 8/2004 | Vero et al. |
| 6,918,241 B2 | 7/2005 | Zhu |
| 7,007,308 B1 | 3/2006 | Howland et al. |
| 7,037,579 B2 | 5/2006 | Hassan et al. |
| 7,048,884 B2 | 5/2006 | Woodford et al. |
| 7,213,419 B2 | 5/2007 | Hardee et al. |
| 7,246,509 B2 | 7/2007 | Hardee et al. |
| 2006/0068140 A1 | 3/2006 | Flather et al. |
| 2006/0150300 A1 | 7/2006 | Hassan et al. |

CUT RESISTANT DAMAGE TOLERANT CHEMICAL AND LIQUID PROTECTIVE GLOVE WITH ENHANCED WET AND DRY GRIP

This application claims priority to U.S. Provisional Patent Application No. 61/089,664, filed Aug. 18, 2008, which is hereby incorporated by reference in its entirety.

TECHNICAL FIELD

This invention relates to gloves that are cut resistant and chemical resistant, where chemical resistance is maintained even when an outer surface of the glove is damaged. The outer surface provides wet and dry grip properties without accumulating liquid.

BACKGROUND

Polymeric shells, including unsupported medical, surgical, and other gloves, are typically made of latex. These polymeric shells are produced in an assembly line fashion by dipping a coagulant-coated former of desired shape into an aqueous latex emulsion, thereby coagulating the latex. The coagulated layer is subsequently cured to form the unsupported polymeric shell. The aqueous latex emulsion may comprise additives, including viscosity modifiers, waxes, surfactants, stabilizers, cross-linking agents and the like, to produce a cured latex product having specific characteristics, such as thickness, tensile strength, tear and penetration resistance, flexibility, etc., in a controlled manner. Aqueous latexes of different compositions are known in the art, and they include natural rubber latexes, synthetic polyisoprenes, and other synthetic latexes, including polychloroprene (i.e., neoprene), nitrile compositions, and the like. Examples of polymeric shells made from a typical aqueous dipping process are described in U.S. Pat. No. 3,268,647 to Hayes et al., which discloses the manufacture of rubber gloves. Nitrile latex gloves are commonly used to provide chemical resistance. Likewise, chemical resistant polymeric shells are commonly made from nitrile latex. The gloves can be provided with skin comfort features such as an open-celled foam lining as described in U.S. Pat. No. 7,048,884 (Woodford), or lined with a flock lining as described in U.S. Pat. No. 7,037,579 (Hassan). Skin-generated moisture is absorbed the open celled foam or flock lining to provide a comfortable feel on the hand of the user.

Supported polymeric shells with a liner are known in the art and are commonly used in industrial environments, such as in the form of gloves for protecting hands, where use of a strong latex product is needed. A number of patents disclose coating the liner with a latex composition. For example, U.S. Pat. No. 2,083,684 to Burke discloses rubber-coated gloves and a method of making the same. U.S. Pat. Nos. 4,514,460; 4,515,851; 4,555,813; and 4,589,940 to Johnson disclose slip-resistant gloves and a method for their manufacture.

Cut resistant liners are also known in the prior art. U.S. Pat. No. 4,526,828 to Fogt, et al. discloses protective apparel material and method for producing same. The protective material comprises a base layer of textile material, an intermediate layer of relatively cut-resistant fiber material, and an outer layer of solid, elastomeric material. The intermediate layer is formed from intermeshing strands of cut resistant materials such as aramid or wire. The intermeshing strands define pores sufficiently large to permit the passage of a dipped elastomeric material while the base layer is sufficiently non-porous to prevent the passage of the dipped elastomeric material. The outer layer of elastomeric material retards penetration by liquid. A cut through the elastomeric layer from a blade tip may penetrate the pores which will result in liquid permeability through the protective glove. Cotton may be a predominant component of the skin-contacting base layer.

U.S. Pat. Nos. 4,779,290 and 4,833,733 to Welch et al. disclose cut resistant surgical glove and the method of making the same. This surgical glove has a ventral side and a dorsal side that are integrally connected by a thin stretchable material layer that is impermeable to air and water. The dorsal side includes a layer of flexible armor embedded in the thin stretchable material. The armor is made from interwoven aramid and nylon fibers. A cut to the thin stretchable layer results in leakage of any liquid contacting the glove and the integrity of the surgical glove is compromised.

U.S. Pat. No. 5,070,540 to Bettcher discloses protective garment having a cover, a fabric liner, and a coating of elastomeric material permeating the cover and adhering the liner and cover together. The fabric liner is in a skin-contacting region. The cover is cut resistant with wire strands. The cover can be knit from yarn that has a core having 2 to 6 strands of stainless steel wire and a parallel synthetic polymer fiber strand, and the core can be wrapped with strands of non-aramid fiber in opposite directions one on top of the other. The elastomeric material can be formed from nitrile latex, which is said to infiltrate the cut resistant cover, but does not infiltrate through the fabric liner, yet infiltrates sufficiently to adhere the liner to the cover. Such precision of latex dipping, however, is not readily realized in industrial practice. Grip on an outer surface of the glove surface is provided by adding pumice to the nitrile latex, which also decreases its impregnating capability into the cut resistant cover. This type of nitrile impregnation is only possible if the cover has knits that are widely spaced, which according to Bettcher, is indicated to be 0.05 inches based on the overall yarn dimension including the core and its wraps. A blade can easily penetrate this wide space between the knits of the cover creating a cut that compromises the impermeability of the elastomeric layer and that permits liquid accumulation. Thus, the protective glove is not damage tolerant.

U.S. Pat. No. 5,581,812 to Krocheski discloses a leak-proof textile glove. The inner surface of a cut-resistant textile layer is bonded to a leak-proof, petroleum-resistant, polymeric material, such as PVC, and the skin contacting side of the leak-proof liner is coated with cotton flock. Any damage to the leak-proof polymeric layer by a sharp object results in leakage of a liquid contacting the glove.

U.S. Pat. No. 5,822,791 to Baris discloses a protective material and a method wherein a base layer comprises cut resistant yarn, an intermediate layer comprises natural fiber, and an outer layer comprises a flexible, elastomeric material impervious to liquid. The intermediate layer is bonded to the elastomeric material, while the cut resistant yarn in the base layer remains substantially free of encapsulation by the elastomeric material. The intermediate layer is joined to the base layer at one or more locations, preferably by selective strike through of limited amounts of the elastomeric material to encapsulate yarn in the base layer. The cut resistant yarn forms the innermost layer of the glove contacting and protecting the hand. However, any damage to the outer elastomeric material results in liquid permeation and thus the material according to Baris does not sustain damage and still protect the user.

U.S. Pat. No. 6,021,524 to Wu et al. discloses cut resistant polymeric films. The cut resistant polymeric films are used for manufacturing medical or industrial gloves and comprises at least three elastomeric layers wherein the middle layer has a three-dimensional network of cut resistant fibers selected from glass fibers, steel fibers, aramid fibers, polyethylene fibers, particle filled polymeric fibers, and their mixtures. The integrity of the cut resistant layer is entirely determined by the character of the network of the cut resistant fibers. Chopped, loose fibers can be moved around especially when encapsulated in a polymeric material such as synthetic or natural rubber and the liquid leak-proof quality of the polymeric film can be easily compromised by a small cut.

U.S. Pat. Nos. 6,543,059 and 6,596,345 to Szczesuil et al. disclose a protective glove and a method for making same. This protective glove for a human hand includes an inner glove of polyester, non-woven, needle-punched material and a melt-sprayed polyurethane coating. This non-woven needle-punched material has no mechanical integrity, unlike a woven or knitted fabric and the hot melt-sprayed polyurethane adhesive holds the configuration together forming a glove. The melt-sprayed glove is heated to a temperature of 300 to 325° F. to allow the remelted polyurethane to penetrate the inner glove to a depth short of penetrating to the inner surface of the inner glove. The polyurethane coating on the outer surface of the inner glove cures in approximately 24 hours by reaction with ambient moisture. The inner glove is further coated with a rubberized material to produce an inner glove held together by the rubber, which is then cut to pieces and sewn, to form a glove with internal sewn seams. Such a glove is not liquid-impervious, since these sewn seams are not bonded and leak. Such a glove is, therefore, not chemically resistant. The protective glove is said to protect from puncture, but the polyester non-woven inner glove will not provide cut resistance. The glove is only leak-proof as long as the polyurethane adhesive layer is not cut and due to the shallow penetration of the polyurethane adhesive coating, it is easy to cut the polyurethane layer.

U.S. Pat. Nos. 6,782,720 and 6,782,721 to Vero et al. disclose unilayer fabric with reinforcing parts. This unilayer flexible textile performance fabric has a base fabric of a predetermined design of a pattern continuously formed by a step of selectively manipulating and chain-stitching on a programmed knitting machine into the base fabric at least one dissimilar high performance fiber into the base fabric in the same layer using a preselected single needle. This selectively reinforced fabric which may have a glove shape has no liquid-impervious latex layer and is therefore not leak-proof.

U.S. Pat. No. 6,918,241 to Zhu discloses cut resistant yarns and process for making the same, fabric and glove. The glove is made by knitting or weaving of a cut resistant yarn comprising polyurethane filament or rubber and a plurality of bulked continuous cut resistant filaments, wherein the plurality of bulked continuous cut resistant filaments have a random entangled loon structure in the yarn. The glove is heat set and a coating of polyurethane or a polynitrile is applied to the glove and cured. The leak-proof quality of the glove relies on the integrity of the polyurethane or polynitrile layer and any damage to this layer results in liquid leakage.

U.S. Pat. No. 7,007,308 to Howland et al. discloses protective garment and glove construction and method for making same. The garment or glove has a cut and puncture resistant protective liner or multiple liners affixed to the inside shell or outside shell of the garment or glove by means of adhesives or stitching. The cut resistant protective liner may be attached to the outer surface of the inside shell by an adhesive layer. Alternatively, the cut resistant liner may be attached to the inside surface of the outside shell by an adhesive layer. When both inside shell and outside shell are present, the cut resistant liner is only attached to the inside shell by an adhesive layer. The liner or the adhesive is not indicated to be leak-proof. The cut resistant liner is not integrally attached to either the inside shell or the outside shell, thus any damage to the outer shell results in liquids leakage. The outer shell does not provide grip properties.

U.S. Pat. Appln. Pub. No. 2006/0068140 to Flather et al. discloses a polymeric shell adherently supported by a liner and a method of manufacture. This glove article has a cured, liquid-impervious polymeric shell that is substantially free from defects, a liner, and a non-tacky, thermoplastic adhesive layer between the shell and the liner. The adhesive layer is melted and solidified to create a non-tacky bond between the shell and the liner. The liner can be moisture-absorbing or cut-resistant and the liner supports and limits stretch ability of the shell, thereby preventing adhesive delamination between the adhesive layer and either of the shell and/or the liner. In one embodiment, the cut resistant liner is outside the liquid-impervious polymeric shell and is bonded by melted and solidified non-tacky polyurethane adhesive. The bond between the shell and the cut resistant liner is generally superficial, that is, the adhesive does not readily penetrate the cut resistant liner. Also, the adhesive used is non-tacky and solid at room temperature, creating a rigid bond between the liner and the liquid-impervious polymeric shell. As a result, upon impact from a blade or the like, there can be free space between the cut resistant liner and the liquid-impervious shell, which can lead to liquid accumulation. This liquid accumulation can reduce the grip properties of the glove since the accumulated liquid acts as a lubricant.

WO Int'l Pub. No. WO2007/024127 to Aaron et al. discloses a method and article of manufacturing a waterborne polyurethane coated glove liner. The process for producing a waterborne polyurethane coated glove liner comprises the compounding of the waterborne polyurethane that is coated on a glove liner using the conventional dipping process of a supported glove. The glove liner to support the glove includes nylon or other synthetic polyamides, polyester, cotton, rayon, Dyneema, Kevlar, Lycra, spandex, acrylic and blended yarns. The polyurethane coating is free of DMF solvent. The waterborne polyurethane coated glove liner is designed to give excellent grip for safe and secure handling. The polyurethane coating is subject to damage by oils and petroleum and is affected by solvents. The contact of polyurethane coating against the hand in a cut resistant fiber may expose sharp ends of the cut resistant liner, thus irritating the skin of the user.

Therefore, there is a need in the art for damage tolerant chemically resistant cut resistant flexible latex glove article that has superior dry and wet grip properties. While handling oily or wet articles, liquid should not accumulate on the surface of the glove compromising glove grip properties. There is a need in the art for a manufacturing process that reliably produces high quality damage tolerant chemically resistant cut resistant gloves on a routine basis at a low cost. These and other objects and advantages, as well as additional inventive features, will be apparent from the detailed description provided herein.

SUMMARY

Provided are damage tolerant cut resistant chemical handling flexible latex gloves and methods of making and using the same. These gloves are flexible and lightweight. A knitted cut resistant liner with cotton fibers in combination with cut resistant fibers is applied to a cured, liquid-impervious polymeric latex shell. Preferably, the polymeric shell is a nitrile shell and is provided with skin moisture management skin-contacting surface treatments including a foamed layer and/or a flock lined layer, preferably a flock lined layer deposited by an electrostatic deposition method. The cut resistant liner that is applied to the polymeric shell can have a slightly smaller glove size so that the knit spaces are opened out when a polymeric bonding layer formed by a water-based soft nitrile or polyurethane is applied. The cut resistant liner is bonded to the shell by these polymer materials. For example, a cured water-based polyurethane latex emulsion penetrates the liner due to the soaking characteristics of the cotton fibers present in the liner. A thin coating of nitrile latex emulsion is applied over the polyurethane layer in a wet state prior to curing. The nitrile protects the polyurethane-coated surface from oil or chemical damage during use. In another example, a soft nitrile bond layer is provided between the cut resistant liner and the liquid impervious polymeric shell, which itself is resistant to oil exposure and would not need the nitrile overcoat used with the polyurethane layer. The flexibility of the glove is a result of the combination of the liquid-impervious polymeric shell, bonded to a stretched cut resistant liner by polymer materials that exhibits high elongation (typically 600% to failure). The cured soft nitrile layer or the polyurethane layer and the protective nitrile layer cured together replicate the texture of the knitted liner, whose plurality of cut resistant and cotton yarns cross each other, thereby creating a rough, controlled, predictable glove external grip surface that provides superior grip properties in wet as well as dry conditions. The soft nitrile layer or the polyurethane and nitrile layers seal the interstices between the yarns of the liner and also bond the liner to the polymeric shell, such that no liquid accumulates between the liner and the shell upon damage to the outer layers. Moreover, the grip properties of the glove are not compromised by lubrication due to an accumulated liquid lubricant layer. When the glove is cut by a sharp object such as a blade or a knife, there are multiple polymer layers including the soft nitrile layer or the nitrile-protected polyurethane layer, which infiltrates the cut resistant liner, and the liquid-impervious polymeric shell. When the soft nitrile layer or the nitrile-protected polyurethane layer is cut, the liquid-impervious shell prevents entry of the liquid onto the user's hand. Even if the soft nitrile or the polyurethane layer is entirely cut, the shell still prevents entry of the liquid. And, the cut resistant liner in its own right prevents the blade tip from cutting the liquid-impervious polymeric shell.

The process for the manufacture of the glove includes creating a liquid-impervious cured latex shell by conventional techniques including providing a former in the shape of a human hand, dipping the former in a coagulant solution such as calcium nitrate solution with several additives, drying the coagulant-coated former, dipping the coagulant-coated former in a latex liquid emulsion, destabilizing the latex at the boundary layer between the coagulant coated former and latex emulsion creating a gelled/coagulated latex layer, and washing the gelled latex layer. The external surface of the gelled/coagulated latex layer may be coated with a foam lining or a flock lining such as an electrostatically deposited cotton flock lining. The glove on the former is then cured in an oven to create a liquid-impervious polymeric shell. When the cured polymeric liquid-impervious shell is inverted upon removal from the former, the surface having the skin moisture management features becomes the skin-contacting side. The moisture management system may be applied in a separate step on the polymeric liquid-impervious shell. The liquid-impervious polymeric shell is then applied to a former with the moisture management features contacting the external surface of the former.

A cut resistant liner is produced by knitting cut resistant yarns that contain some content of cotton fibers. The cut resistant yarns can comprise steel fibers, aramid fibers, glass fibers, liquid crystal fibers such as Spectra™, Dyneema™ and high hardness (>3 moh hardness) particle filled fibers and combinations thereof. The cut resistant fibers may be optionally wrapped with non-performance fibers including cotton, nylon, polyester, and combinations thereof. The knitted cut resistant liner is preferably of a slightly smaller dimension so that when the cut resistant knitted liner is slipped over the polymeric shell on the former, the knits of the liner are slightly stretched enabling infiltration of the water-based polyurethane latex emulsion between the interstices, that is, the spaces between the knitted liner yarns.

Next, the cured liquid impervious shell is applied to a former. The former may be a solid former, which can be difficult to dress with the liquid impervious polymeric shell, especially if the latex thickness is of the order of 13 mils. The former may be a wire form former or an inflatable former which is easy the dress even with a 13 mil thick liquid impervious shell. A cut resistant knitted liner with yarns that include cotton fibers is dressed over the outer surface of the liquid impervious glove shell on the former. The former with the liquid-impervious polymeric shell with the cut resistant liner is dipped in a water-based soft nitrile or polyurethane latex emulsion. Due to the low viscosity of the water-based soft nitrile or polyurethane latex emulsion and the soaking characteristics of the cotton fibers in the cut resistant liner, the soft nitrile latex emulsion or polyurethane latex emulsion enters interstices between the knits in the cut resistant liner and soaks through all the cotton fibers in the cut resistant liner creating a soft nitrile or polyurethane layer that replicates the knitted cut resistant liner surface features, yet creating a seal between each of the knits. The water-based soft nitrile or polyurethane latex emulsion creates an adhesive bond between the liquid-impervious polymeric shell and the cut resistant liner.

In one embodiment, the water-based soft nitrile coated polymeric shell with the cut resistant liner is taken out from the water-based soft nitrile latex emulsion bath and is rotated from the vertical dipping position to a horizontal position and gently rotated. This operation prevents the dripping of the low viscosity soft nitrile latex emulsion and covers the yarns of the cut resistant liner, while the interspaces in between the knits remain not filled up and hence depressed. This texture is frozen in place by dipping the soft latex covered polymeric liquid impervious shell with the cut resistant liner in a coagulant such as a calcium nitrate solution. The coagulating action freezes the soft nitrile layer outer surface texture even though underlying soft nitrile latex emulsion below the surface may still be uncoagulated. The former with the liquid impervious shell, cut resistant liner that is coated with soft nitrile layer is taken to a curing furnace, which cross-links the coagulated and uncoagulated soft nitrile latex layer equally creating a bond between the cut resistant liner and the polymeric liquid impervious shell.

In another embodiment, the water-based polyurethane coated polymeric shell with the cut resistant liner is taken out from the water-based polyurethane latex emulsion bath and is rotated from the vertical dipping position to a horizontal position and gently rotated. This operation prevents the dripping of the low viscosity polyurethane latex emulsion and covers the yarns of the cut resistant liner, while the interspaces in between the knits remain not filled up and hence depressed. This texture is frozen in place by dipping the soft latex covered polymeric liquid impervious shell with the cut resistant liner in a coagulant such as a calcium nitrate solution. The coagulating action freezes the polyurethane outer surface texture even though underlying polyurethane latex emulsion below the surface may still be uncoagulated. The external surface of the glove with the polyurethane coating is then sprayed with a thin layer of nitrile latex coating in the uncured wet state. The viscosity of the sprayed nitrile latex should be low so that the nitrile layer covers the entire polyurethane external surface of the glove and the low viscosity of the nitrile latex assures that the surface features of the knit surface replicated by the water-based polyurethane on the cut resistant liner outer surface are preserved providing an external surface that has excellent grip properties. This thin nitrile layer may be optionally applied by a dipping procedure using a thin nitrile latex emulsion with low nitrile polymer solid content. The former with the liquid impervious shell, cut resistant liner that is coated with polyurethane and nitrile layers is taken to a curing furnace, which cross links the coagulated and uncoagulated polyurethane and nitrile layers equally creating a bond between the cut resistant liner and the polymeric liquid impervious shell. Since the polyurethane layer cures at the same time as the nitrile layer, an intimate bond is established between the liquid-impervious polymeric shell, the polyurethane layer, and the nitrile layer forming a high strength, yet flexible glove.

The glove article created covers the entire front, back and wrist of the user. High level of flexibility of the glove article is due to use of thin liquid-impervious polymeric shell, typically soft nitrile that has low modulus, a cut resistant liner that is stretched and held in place by low modulus high elongation soft nitrile or nitrile-protected polyurethane layer that adhesively bonds the cut resistant liner to the liquid-impervious polymeric shell resistant to chemical or oil damage. The wet and dry grip character of the glove arises from the soft nitrile or nitrile-protected polyurethane layer replicating the knit structure that appears like a rough textured surface that replicates series of sealed knit squares that are not filled up to form a smooth flat surface. Thus, any liquid applied to the external surface of the glove upon damage to the glove is prevented from getting into the space between the cut resistant knitted liner and the liquid-impervious polymeric shell. If this were to happen, the accumulated liquid in between the cut resistant liner and the liquid-impervious polymeric shell will result in a lubricious liquid boundary layer providing very little or no glove gripping capability. If the glove were to be damaged during use, for example by a blade cut, the glove leak-proof qualities are protected first by the soft nitrile or nitrile-protected polyurethane layer. The cut resistant liner prevents the liquid-impervious polymeric shell from being damaged, so that the user is protected from exposure to liquid even when the glove surface is damaged.

DETAILED DESCRIPTION

Figure 1:
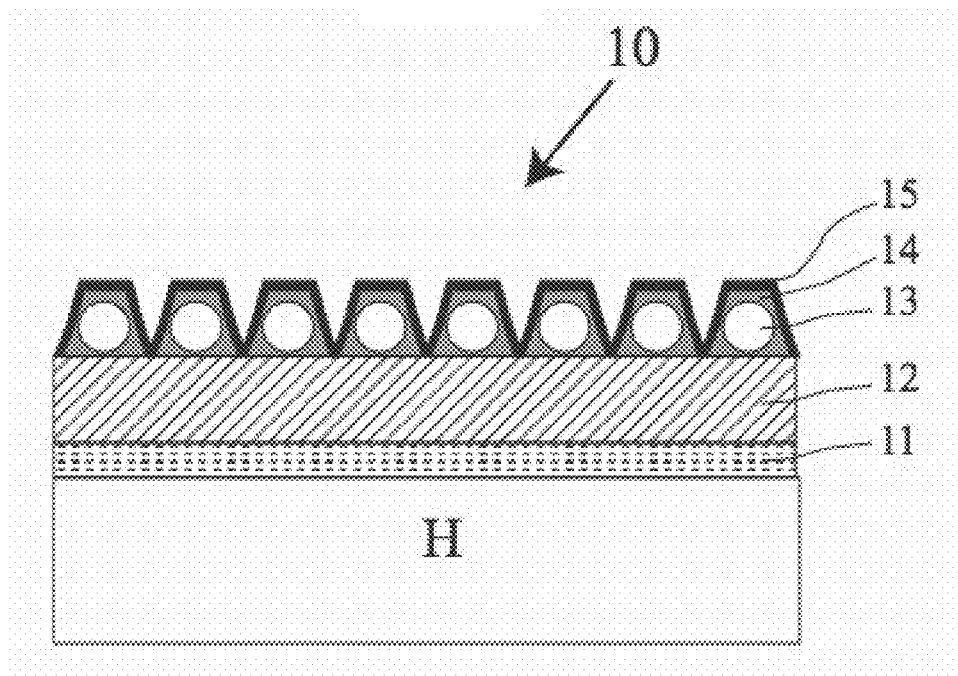
FIG. 1 illustrates a fragmentary cross-sectional view of the damage tolerant cut resistant chemical resistant flexible latex glove article according to subject invention having a liquid-impervious chemical resistant polymeric shell of, for example, nitrile or polychloroprene latex, with a cotton fiber containing cut resistant liner that has been infiltrated and anchored with a water-based soft nitrile or nitrile-protected polyurethane layer resistant to degradation by oils and chemicals.

Provided are cut resistant chemical handling latex gloves and methods of making and using the same. Generally, provided are gloves having a liquid-impervious polymeric shell, a cut resistant, cotton-containing liner that has been encased in a polyurethane coating, and an outer coating of nitrile. In one or more detailed embodiments, provided is a latex glove comprising a cured, liquid-impervious chemical resistant polymeric shell substantially free from defects, an optional electrostatic flock coating on the surface of the polymeric shell on the skin-contacting surface, a cut resistant, cotton-containing liner that has been encased in a polyurethane coating integrally connecting the cut resistant liner with the liquid-impervious chemical resistant polymeric shell and replicating the surface texture of the knitted cut resistant liner. FIG. 1 provides a geometrical arrangement of the glove 10, which represents a cross-section of the glove. A hand of the user is located at H inside the interior of the glove. An optional moisture management liner 11 on the skin-contacting surface can be an open-celled foam, or an electrostatically applied flock, such as cotton flock. The liquid-impervious polymeric shell 12 is typically 9 to 13 mil thick. A knitted cut resistant liner with cut resistant fibers and cotton fibers 13 is attached to the liquid-impervious polymeric shell by the infiltration of water-based soft nitrile or polyurethane latex 14. The water-based soft nitrile or polyurethane impregnates the cut resistant liner containing cotton fibers and cut resistant fibers 13, soaks through the liner and creates a bond between the cut resistant liner and the polymeric shell. The water-based soft nitrile or polyurethane seals the individual fibers within the yarn and seals the spaces between the fibers of the cut resistant liner forming a leak-proof seal against the liquid-impervious polymeric shell. The soft nitrile or polyurethane layer replicates the surface texture of the liner providing a rough surface texture that is capable of providing dry and wet grip when the glove is cured. Since a polyurethane layer is susceptible to attack by chemicals and oil, a thin overcoat of nitrile latex layer 15 protects the polyurethane layer 14. A soft nitrile layer 14 does not need this nitrile coating 15 since it is already degradation resistant by chemicals or oil.

Figure 2:
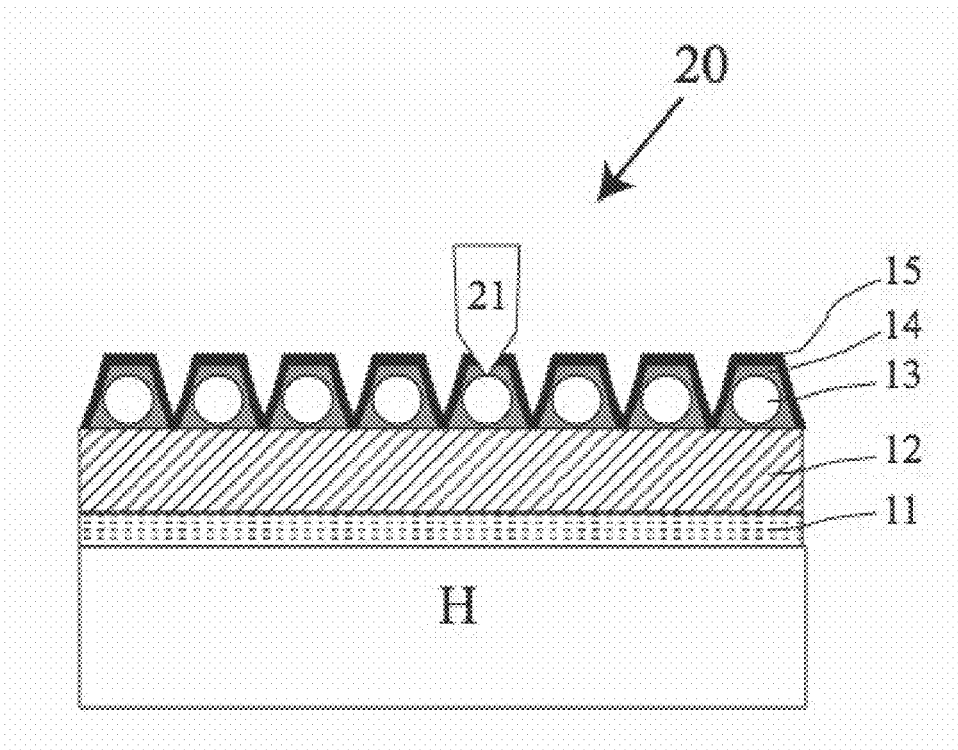
FIG. 2 illustrates a fragmentary cross-sectional view of the latex article of FIG. 1 placed on a compliant substrate such as a hand with the interior surface of the liquid-impervious chemical resistant polymeric shell contracting the hand and a knife contacting the soft nitrile or nitrile-protected polymeric coating resulting in cutting of both the soft nitrile layer or the nitrile-protected polyurethane layer with the cut resistant liner preventing damage to the liquid-impervious polymeric shell at the knife edge.

FIG. 2 at 20 depicts the interaction between a blade tip/a knife-edge 21 with an embodiment of a glove made according to the subject invention. The blade tip cuts through the nitrile layer 15 and partially cuts through the polyurethane layer 14. The blade may similarly cut through the soft nitrile layer 14. The cutting action stops as it encounters the cut resistant fibers of the knitted cut resistant liner 13. Since the cut resistant liner is completely wetted and sealed by the soft nitrile layer 14 or the polyurethane layer 14 and the nitrile layer 15, no liquid can accumulate, that is no liquid can enter through and occupy the interstices of the cut resistant liner 13 and the outer portion of the liquid-impermeable polymeric shell 12. Liquid accumulation could create a liquid pocket that lubricates a gripped object severely reducing grip provided by the glove, but does not because there is no accumulation. No liquid enters the glove or touches the hand since the liquid-impermeable polymeric shell remains intact directly below the cut resistant liner, thus the glove of the subject invention is damage tolerant.

The polymeric shell needs to be liquid-impermeable so that the resultant article is liquid resistant. For chemical resistance, the shell needs to be an elastomer that is chemically resistant. The polymeric shell generally comprises a synthetic latex, such as nitrile latex or polychloroprene latex, and is highly flexible due to its high degree of soft feel. Nitrile latex has a low modulus and therefore feels soft on the hand and larger thickness gloves can be made with a comfortable feel. The thickness of polymeric shell, made of, for example, nitrile latex or polychloroprene latex that covers the user's hand is typically in the range of 9 mil to 13 mil.

Figure 3:
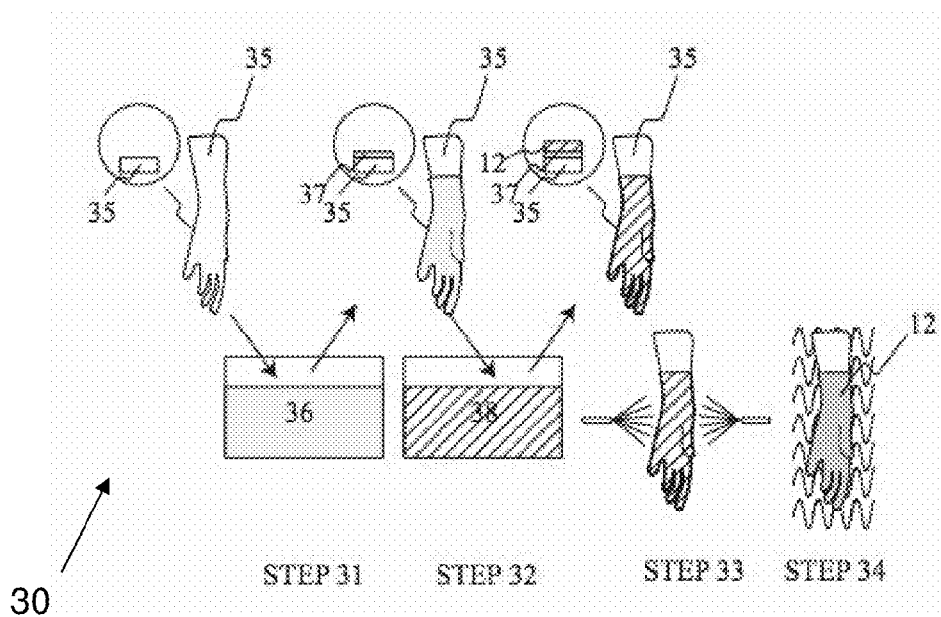
FIG. 3 illustrates the steps involved in producing a liquid-impervious chemical resistant polymeric shell.

FIG. 3 provides a schematic diagram 30 representing the manufacturing process for the liquid-impervious latex polymeric shell. In step 31, a suitable former 35, such as a ceramic or metallic former, in the shape of a human hand and forearm is dipped in a coagulant solution 36, which is typically calcium nitrate and forms a film 37. In step 32, the coagulant-coated former is dipped into an aqueous latex emulsion tank 38, containing an aqueous nitrile latex for example, and the coagulant locally destabilizes the latex emulsion forming a gelled latex layer 12 on the former 35. A nitrile latex emulsion typically is water-based and contains a base nitrile latex in an amount of approximately 100 phr, a cross-linking agent such as sulfur in an amount of approximately 0.5 phr, an accelerator such as zinc oxide in an amount of approximately 3.0 phr, an accelerator such as ZMBT in an amount of approximately 0.7 phr, and surfactants such as sodium or calcium dodecyl-benzenesulphonate, emulsion stabilizers, and viscosity moderators. This process may be repeated until a sufficient latex layer is built up on the former 35. The former 35 with the gelled latex layer 12 is washed in step 33, and cured in step 34 to cross link the latex 12. The inner surface of the polymeric shell may be coated with latex foam or electrostatically applied cotton flock to produce a soft sweat-absorbing surface that contacts the hand of the user using known methods.

Figure 4:
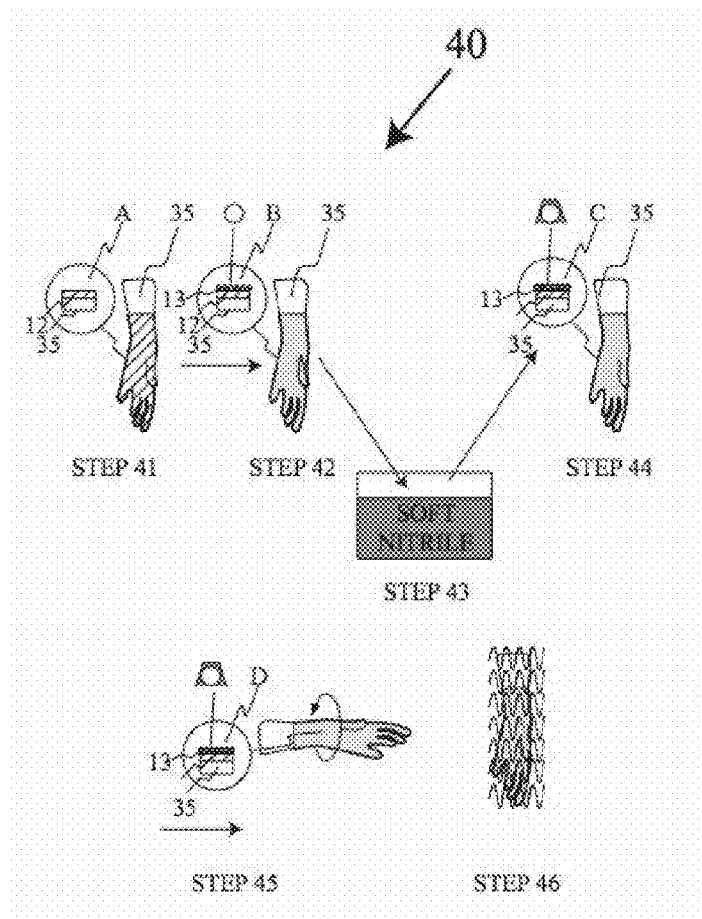
FIG. 4 illustrates the steps involved in dressing a former with a liquid-impervious polymeric shell at step A; applying a cotton-containing cut resistant liner over the outer surface of the impervious chemical resistant polymeric shell at step B; encapsulating the cotton-containing cut resistant liner with a soft nitrile latex layer that replicates the surface texture of the cut resistant liner at step C; and sealing the spaces in the cut resistant liner and integrally attaching the cut resistant liner with the liquid-impervious polymeric shell by the soft nitrile layer.

FIG. 4 provides a schematic diagram 40 for the process of creating the damage tolerant cut resistance surface on the liquid-impervious polymeric shell 12. The cured polymeric shell made from, for example, nitrile latex or polychloroprene latex is mounted over a glazed or polished former, a wire former or an inflatable former 35 of the desired shape and size, shown as configuration A at step 41. The interior hand-contacting surface of the polymeric shell, which can have the optional skin moisture controlling cotton flock (not shown) contacts the former 35. A cut resistant knitted liner 13 is slipped over the external surface of the liquid-impervious polymeric shell 12 in step 42 and the resulting configuration is shown as configuration B. It is desirable that the knitted cut resistant liner is slightly of a smaller glove size so that the knits of the liner are well spread out for the next process step. The preferred cut resistant liner comprises 20 micron steel yarns knitted with a cotton carrier with a three dimensional knit patterns preferably tailored to match the anatomical shape of a human hand and forearm as exemplified in U.S. Pat. No. 7,213,419 (Hardee) and U.S. Pat. No. 7,246,509 (Hardee). The cut resistant liner 13 generally has a thickness in the range of 15 to 30 mils. The former 35 with the liquid-impervious polymeric shell 12 and the cut resistant liner 13 is dipped in to a water-based soft nitrile latex emulsion bath marked 'SOFT NITRILE' in step 43 and removed in step 44 creating a configuration shown at C. The former with the soft nitrile coated glove is withdrawn and turned into a horizontal orientation and rotated to uniformly coat the yarns of the cut resistant liner while leaving the interstices between knits depressed as shown in configuration D, step 45. The former with the soft nitrile coated glove is dipped in or sprayed with a coagulant solution (not shown since the texture is preserved) to freeze the surface texture of the soft nitrile layer. The former with the soft nitrile layer coated glove is heated in step 46 to cure and bond the applied coating.

Figure 5:
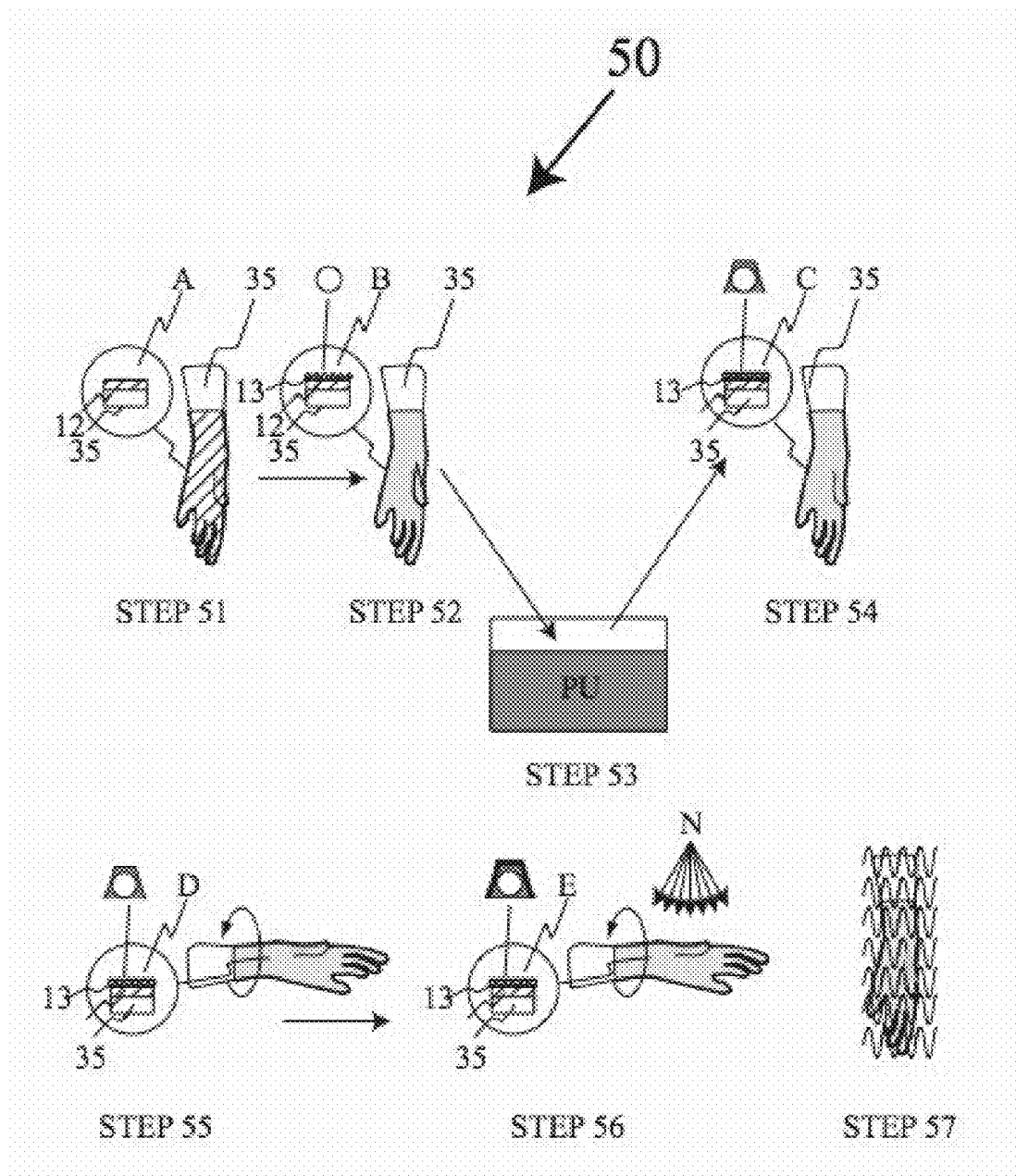
FIG. 5 illustrates the steps involved in dressing a former with a liquid-impervious polymeric shell at step A; applying a cotton-containing cut resistant liner over the outer surface of the impervious chemical resistant polymeric shell at step B; encapsulating the cotton-containing cut resistant liner with a polyurethane latex layer that replicates the surface texture of the cut resistant liner at step C; and sealing the spaces in the cut resistant liner and integrally attaching the cut resistant liner with the liquid-impervious polymeric shell by the polyurethane layer, followed by the application of nitrile-protective layer by spraying on the coating at step D.

FIG. 5 provides a schematic diagram 50 for the process of creating the damage tolerant cut resistance surface on the liquid-impervious polymeric shell 12. The cured polymeric shell made from, for example, nitrile latex or polychloroprene latex is mounted over a glazed or polished former a wire former or an inflatable former 35 of the desired shape and size, shown as configuration A at step 51. The interior hand-contacting surface of the polymeric shell, which can have the optional skin moisture controlling cotton flock (not shown) contacts the former 35. A cut resistant knitted liner 13 is slipped over the external surface of the liquid-impervious polymeric shell 12 in step 52 and the resulting configuration is shown as configuration B. It is desirable that the knitted cut resistant liner is slightly of a smaller glove size so that the knits of the liner are well spread out for the next process step. The preferred cut resistant liner comprises 20 micron steel yarns knitted with a cotton carrier with a three dimensional knit patterns preferably tailored to match the anatomical shape of a human hand and forearm as exemplified in U.S. Pat. No. 7,213,419 (Hardee) and U.S. Pat. No. 7,246,509 (Hardee). The cut resistant liner 13 generally has a thickness in the range of 15 to 30 mils. The former 35 with the liquid-impervious polymeric shell 12 and the cut resistant liner 13 is dipped in to a water-based polyurethane latex emulsion bath marked 'PU' in step 53 and removed in step 54 creating a configuration shown at C. The former with the polyurethane coated glove is withdrawn from the water-based polyurethane latex emulsion bath and turned into a horizontal orientation and rotated to uniformly coat the yarns of the cut resistant liner while leaving the interstices between knits depressed as shown in configuration D, step 55. The former with the polyurethane coated glove is sprayed with a thin nitrile latex emulsion as shown in configuration E at step 56 covering the polyurethane external surface of the glove. The former with the polyurethane and nitrile coated glove is heated in step 57 to cure and bond the applied coating.

The performance of the cut resistant latex glove article is evaluated by cut resistance ASTM tests. A 4-inch long strip is cut from the cut resistant latex glove article and is mounted using a double sided tape securing the hand-contacting side of the glove to a cylindrical steel mandrel with the axis of the cylinder oriented along the knife movement. The curvature of the mandrel prevents binding of the knife and the generation of frictional forces. A cutting blade is mounted on a rotatable arm and was loaded with a selected weight. The arm with the cutting blade is rotated exerting a cutting force on the cut resistant latex glove article strip on the polymeric coating surface. The knife progressively cuts and eventually cuts through the glove strip. The length of the cut is recorded.

Next, the glove strip is displaced and the knife is loaded with an increased weight and the test is repeated. The cut length as a function of the knife-selected load is determined. Clearly, as the load increases, the cut length decreases since the knife readily cuts through the glove strip. The cut resistance is found to be satisfactory.

All references, including publications, patent applications, and patents, cited herein are hereby incorporated by reference to the same extent as if each reference were individually and specifically indicated to be incorporated by reference and were set forth in its entirety herein.

The use of the terms "a," "an," "the," and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the illustrated embodiments are exemplary only, and should not be taken as limiting the scope of the invention.

What is claimed is:

1. A damage tolerant flexible cut resistant chemical handling latex glove having an interior and an exterior comprising:
    a cured, liquid-impervious polymeric latex shell;
    exterior to the latex shell, a knitted cut resistant liner comprising a cotton yarn and at least one cut resistant yarn, the liner defining interstices between knits of the liner, the yarn and the interstices defining a rough surface texture; and
    a polymer bonding layer that bonds the liner to the shell;
    wherein the polymer bonding layer:
    bonds to the liner integrally;
    replicates the rough surface texture of the liner, thereby providing a glove external surface with excellent grip properties; and
    seals the interstices of said liner, thereby preventing liquid accumulation between the cut resistant liner and the liquid-impervious polymeric latex shell upon damage to the bonding layer;
    wherein the glove protects a user's hand from liquid leakage upon damage.

2. The glove of claim 1, wherein the bonding layer comprises a water-based latex.

3. The glove of claim 2, wherein the bonding layer comprises a cured nitrile latex.

4. The glove of claim 3, wherein the cured nitrile latex is a soft nitrile.

5. The glove of claim 3, wherein the bonding layer further comprises a cured polyurethane latex.

6. The glove of claim 1, wherein the bonding layer has an elongation of at least 600% to break.

7. The glove of claim 1, wherein the shell comprises a synthetic latex composition of nitrile, polychloroprene, or combinations thereof.

8. The glove of claim 1 that covers both a hand and a forearm of a user.

9. The glove of claim 1, further comprising a moisture management lining on a skin-contacting surface.

10. The glove of claim 9, wherein said moisture management lining comprises an open-celled foam lining, a cotton flock lining, or both.

11. The glove of claim 1, wherein the shell has a thickness in the range of 9 to 13 mil, the liner has a thickness of 15 to 30 mil, and the bonding layer has a thickness in the range of 15 to 35 mil.

12. The glove of claim 1 having an overall thickness in the range of 50 to 75 mils.

13. The glove of claim 1, wherein said at least one cut resistant yarn comprises a fiber selected from the group consisting of steel, aramid, glass, liquid crystal, high hardness particle-filled, and combinations thereof.

14. The glove of claim 1, wherein the at least one cut resistant yarn is wrapped with a non-performance fiber selected from the group consisting of cotton, nylon, polyester, and combinations thereof.

15. The glove of claim 1, wherein said at least one cut resistant yarn comprises steel fibers having a nominal size of 20 microns.

16. A method for the manufacture of a damage tolerant cut resistant chemical handling latex glove, the method comprising:
    providing a cured, liquid-impervious polymeric latex shell on a hand-shaped former;
    providing a knitted cut resistant liner comprising a cotton yarn and at least one cut resistant yarn, the liner defining interstices between knits of the liner, the yarn and the interstices defining a rough surface texture;
    placing the liner over the shell;
    bonding the shell to the liner by immersing said former with the liner over the shell in a water-based latex emulsion;
    removing the former with the dipped shell and liner and rotating in a horizontal plane to distribute the latex emulsion on the yarns;
    curing the distributed latex to form a bonding layer that replicates the rough surface texture of the liner, providing a glove external surface with excellent grip properties, providing a bonding layer that integrally bonds the liner, and providing a bonding layer that seals the interstices of the liner, thereby preventing liquid accumulation between the cut resistant liner and the liquid-impervious polymeric latex shell upon damage to said bonding layer;
    thereby forming the glove, which protects a user's hand from liquid leakage upon damage.

17. The method of claim 16, wherein the bonding layer comprises a cured soft nitrile latex.

18. The method of claim 17, wherein the bonding layer comprises a cured polyurethane latex layer and a nitrile layer.

19. The method of claim 17, wherein the bonding layer has an elongation of at least 600% to break.

20. A method of protecting a hand from cuts and chemicals while providing excellent wet grip, the method comprising wearing the glove of claim 1.

* * * * *